(12) United States Patent
Franke et al.

(10) Patent No.: US 6,681,305 B1
(45) Date of Patent: Jan. 20, 2004

(54) METHOD FOR OPERATING SYSTEM SUPPORT FOR MEMORY COMPRESSION

(75) Inventors: Hubertus Franke, Cortlandt Manor, NY (US); Bulent Abali, New York, NY (US); Lorraine M. Herger, Kingston, PA (US); Dan E. Poff, Mahopac, NY (US); Robert A. Saccone, Jr., Glenhead, NY (US); T. Basil Smith, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 09/584,033

(22) Filed: May 30, 2000

(51) Int. Cl.[7] .............................................. G06F 12/00

(52) U.S. Cl. ............................ 711/170; 711/2; 711/202

(58) Field of Search .............................. 711/170, 171, 711/172, 202, 203, 208, 2

(56) References Cited

U.S. PATENT DOCUMENTS

| | | | |
|---|---|---|---|
| 5,426,752 A | * | 6/1995 | Takahasi et al. ............. 711/209 |
| 5,577,221 A | * | 11/1996 | Liu et al. ..................... 711/100 |

OTHER PUBLICATIONS

Virtualizing the VAX architerecture. Judith S. Hall, Paul T. Robinson. ACM SIGARCH Computer Architecture News, Proceedings of the 18th annual international symposium on Computer architecture Apr. 1991, vol. 19 Issue 3.*

* cited by examiner

Primary Examiner—Matthew Kim
Assistant Examiner—Matthew D. Anderson
(74) Attorney, Agent, or Firm—Scully, Scott, Murphy & Presser; Douglas W. Cameron, Esq.

(57) ABSTRACT

In a system with hardware main memory compression, the method of this invention monitors the physical memory utilization and if physical memory is near exhaustion it forces memory to be paged out, thus freeing up real memory pages. These pages are then zeroed, thus they are highly compressible and therefore reduce the physical memory utilization. Pages that have been forced out due to high physical memory utilization are not made available for allocation. In systems where operating system changes are permitted, this invention dynamically controls the minimum size of the free page pool and zeros pages upon freeing. When the physical memory utilization falls below a critical threshold the mechanism reduces the minimum size of the free pool to allow further allocation. In systems where operating system changes are not possible, pages are allocated by a module (e.g. Device driver) and then zeroed. When the physical memory utilization falls below a critical threshold this method frees some of the explicitly set aside pages.

19 Claims, 7 Drawing Sheets

System Architecture for Systems with Main Memory Compression

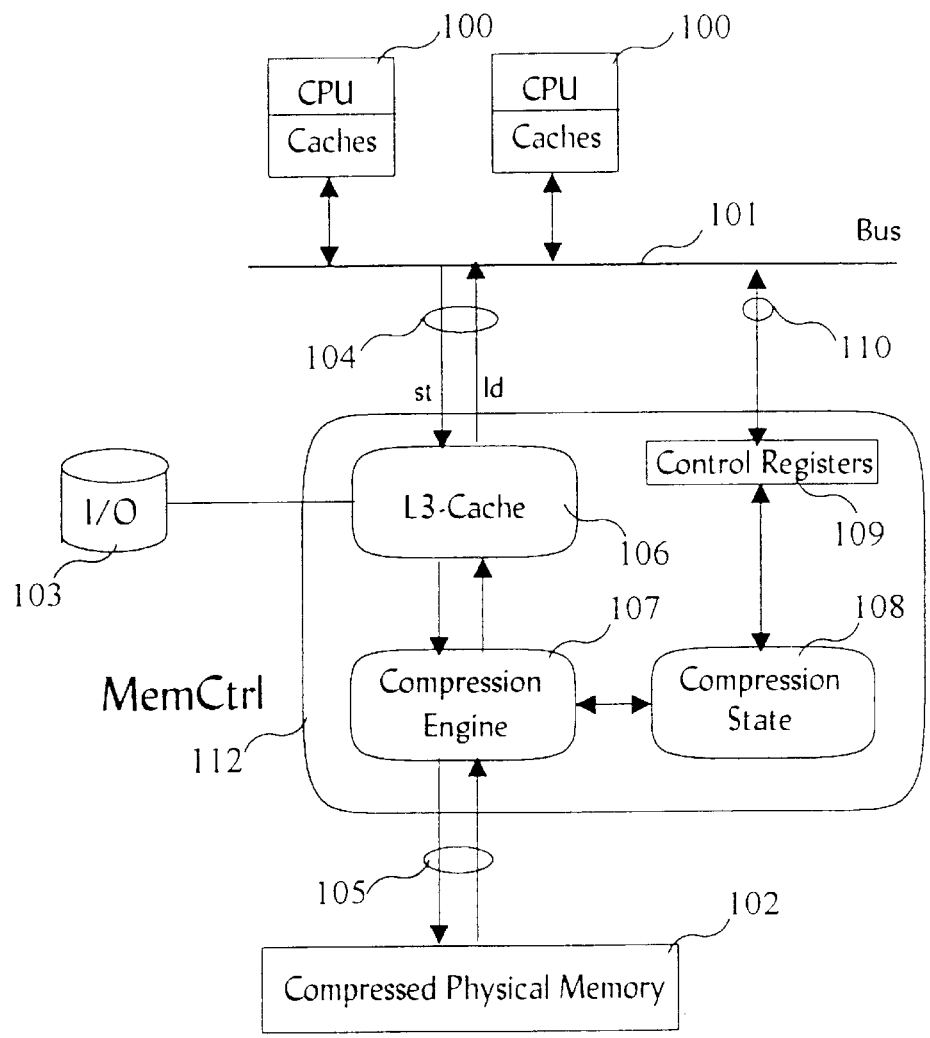
Figure 1: System Architecture for Systems with Main Memory Compression

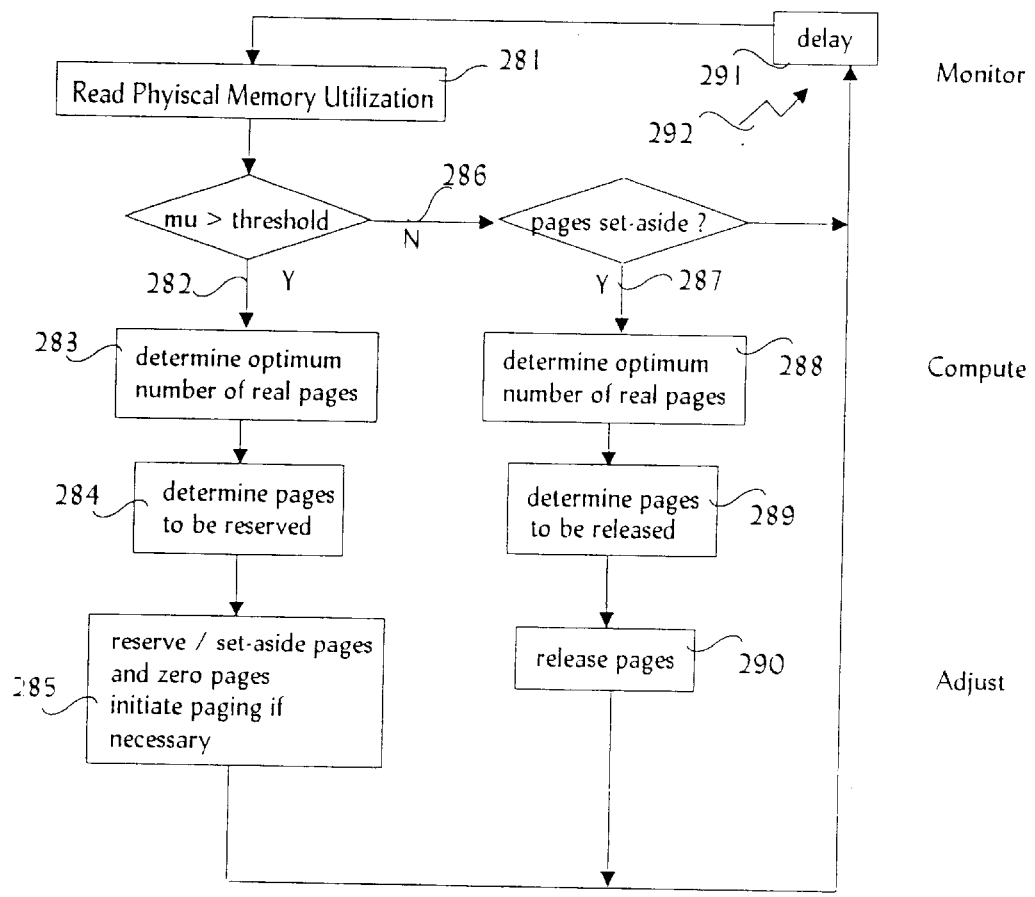
Figure 2 General Flow Diagram of Free Page Management in the Presence of Hardware Main Memory Compression

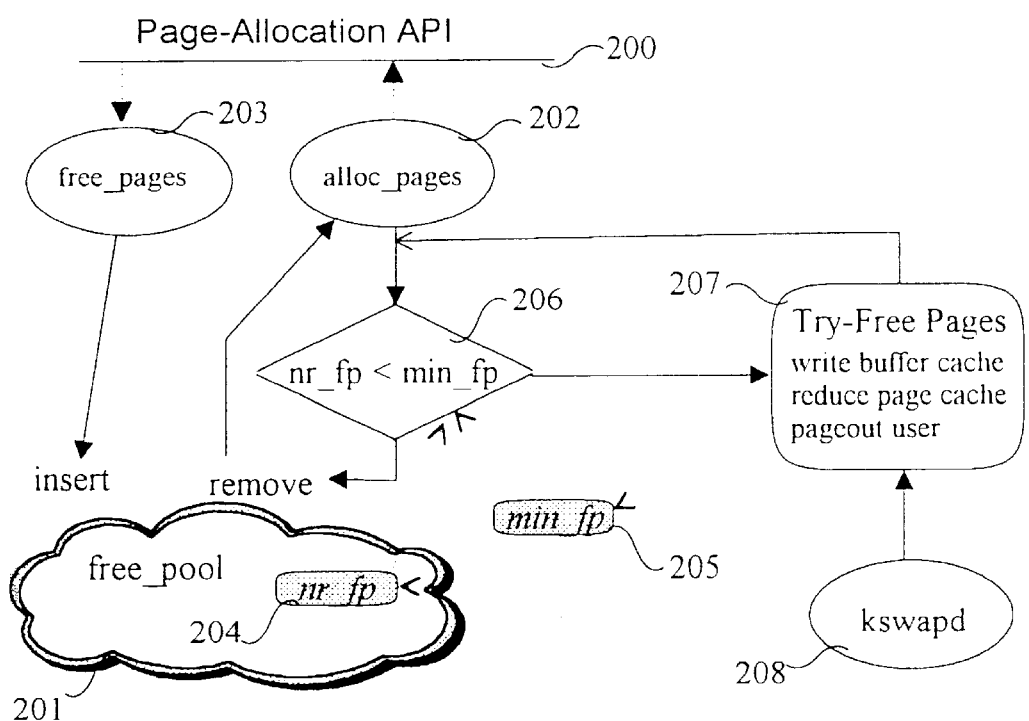
Figure 3: Standard Operating System Page Management

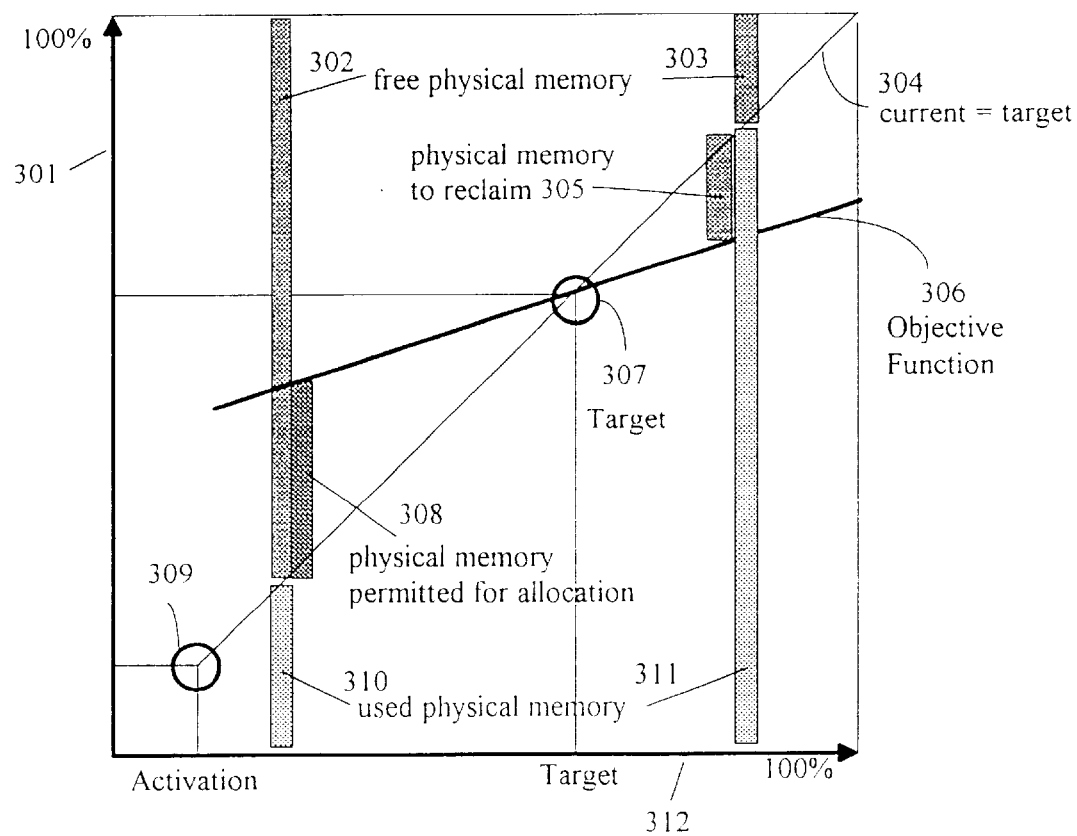
Figure 4: Determination of the Optimum Number of Allocateable Pages

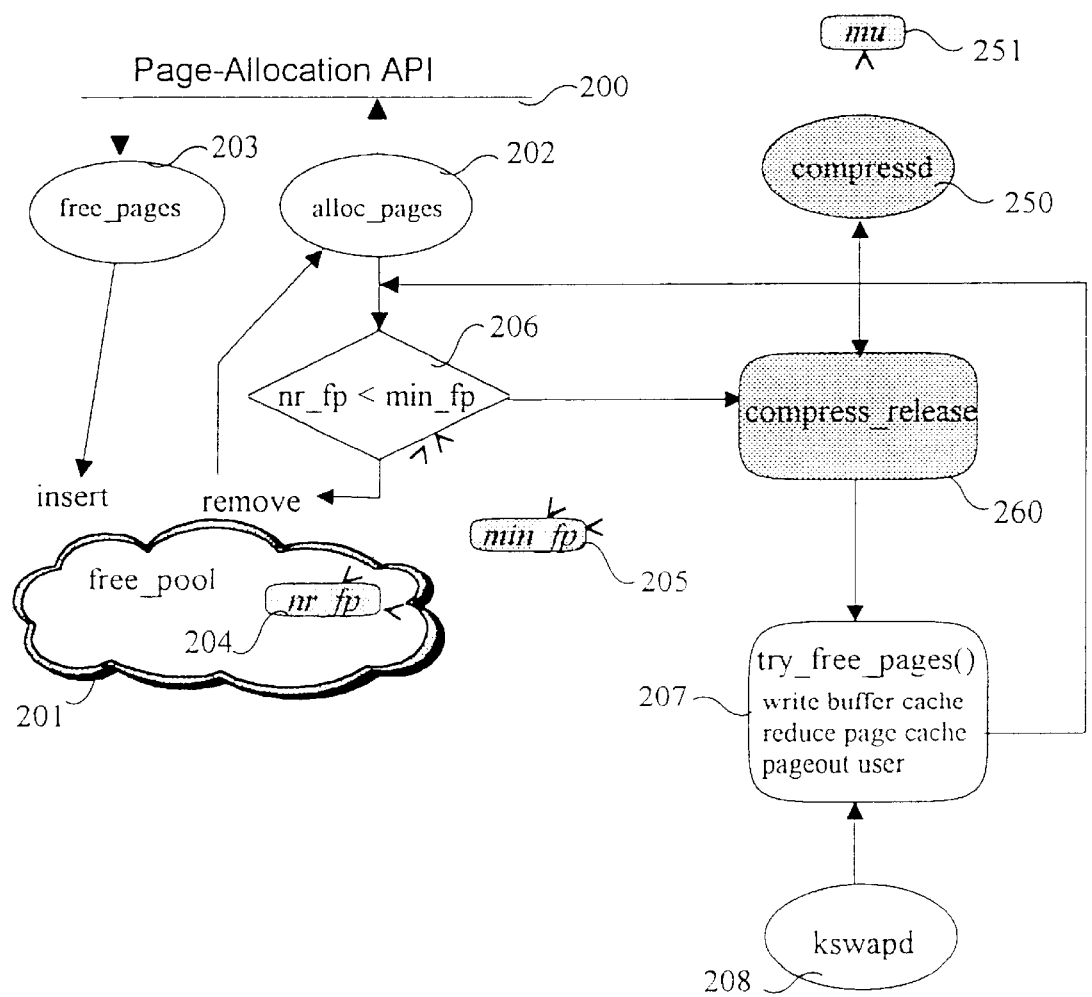
Figure 5: Compression Interaction Page Management

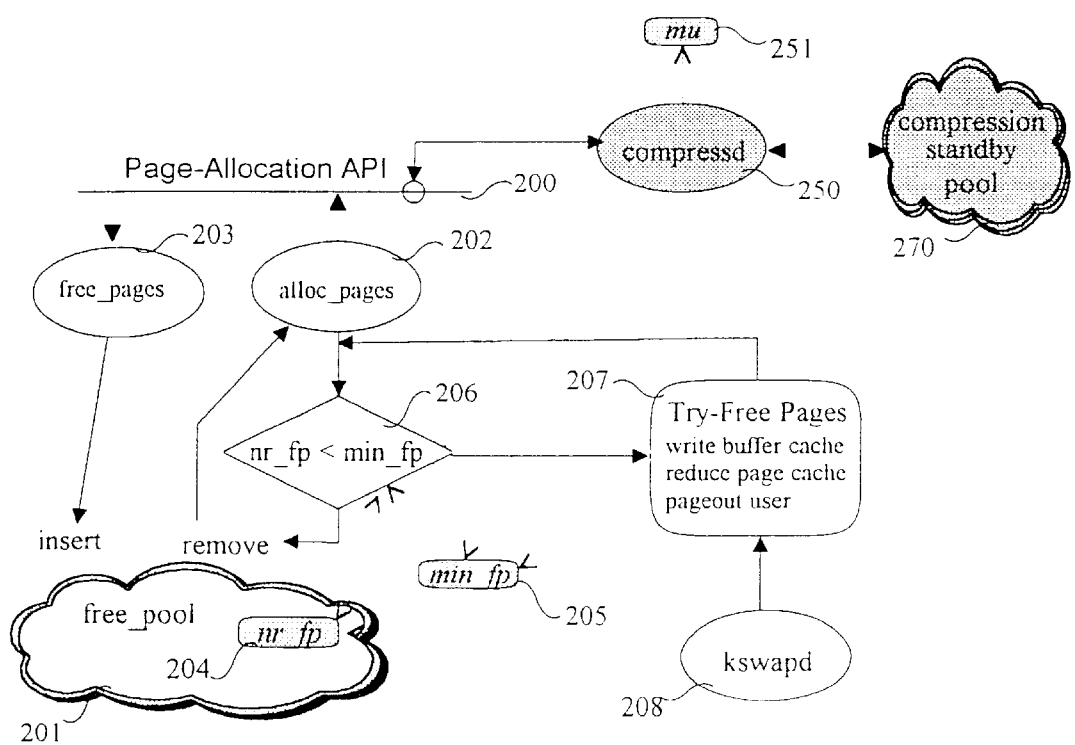
Figure 6: Compression Interaction Page Management

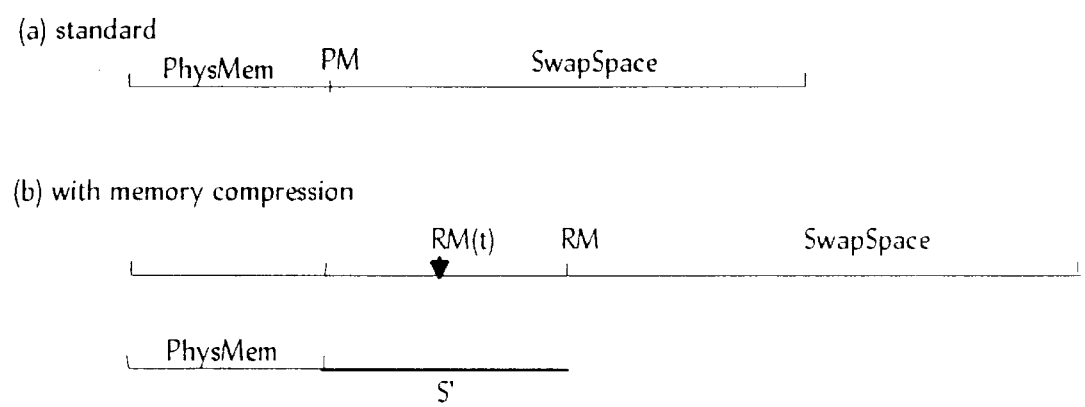
Figure 7: Swap Space Reservation for Memory Compression

METHOD FOR OPERATING SYSTEM SUPPORT FOR MEMORY COMPRESSION

FIELD OF THE INVENTION

The present invention relates to computing system with hardware compression of main memory content, and more particularly to the management of the dynamically changing memory size that is due to hardware main memory compression.

BACKGROUND OF THE INVENTION

Data compression techniques are extensively used in computer systems to save storage space or bandwidth. Both hardware and software based compression schemes are used for storing data on magnetic media or for transmitting data over network links. Memory footprints of large number of applications show that main memory contents can be compressed by 2 to 1 or more in most cases. Only few applications' data, which are already compressed or encrypted, cannot be further compressed. Two to one compression effectively doubles the amount of memory at the same cost, or in cost sensitive applications gives the same amount of memory at ½ the cost.

Main memory compression is a technique that utilizes transparent, real-time, on-the-fly compression of data access to reduce the physical memory requirement or to expand the physical memory usage. Due to the variable length record problem that results from compressing data blocks or pages, random access of compressed pages of data was thought to be impractical until recently. However advances in parallel compression-decompression algorithms described in U.S. Pat. No. 5,729,228 coupled with improvements in silicon density and speed now makes main memory compression practical.

Shown in FIG. 1 is a computer system that supports main memory compression in accordance with the current invention. It consists of one or a plurality of CPUs each with associated caches 100, communicating over a bus 101 to the memory controller 112. The compressed memory architecture adds one additional level to the conventional memory hierarchy. A distinction between "real" and "physical" addresses is made. Real addresses 104 are the conventional memory addresses seen on the processor chip's external bus. Physical addresses 105 are used for addressing the compressed physical memory. The memory controller typically embodies/controls an L3 cache 106 which looks to the CPUs just like memory. Further I/O device 103 addressing is controlled by the memory controller. The following terms are interchangeably used in the literature: "expanded memory" for the "real memory," since compression increases the effective memory size and "compressed memory" for the "physical memory" backing this expanded memory.

In such systems the operating system manages the real memory space and is oblivious to the physical memory itself. The compression engine 107 within the memory controller chip compresses a cache line upon a cacheline store and decompresses upon a load. The various variable length data records of the compression stored in physical memory 102 is accessed through a real to physical address translation which are maintained as part of the compression state 108. We expect the system and in particular the memory controller to export a set of utilization registers 109 that allow the operating system to monitor 110 the physical memory utilization. Optionally, the memory controller may have a set of threshold registers 109 that can be set and if physical memory utilization exceeds the threshold, the memory controller will issue an interrupt.

The compressability CR(t) of the data under the control of the operating system at any given time t determines how much real memory RM(t) the system can sustain at that time without exhausting the fixed amount of physical memory PM. Standard operating systems describe their real memory via a set of page frame descriptors. This is typically a fixed number. In general systems without main memory compression support, real memory is equal the physical memory. However in systems with main memory compression support, the memory management is governed by the following equation:

$$RM(t)=CR(t)*PM \qquad \text{(Eq. 1)}$$

The effective real memory size, i.e. the number of pages that are handed out by the OS for applications and OS specific tasks (e.g. file system cache), depends on the current compression ratio CR(t) which may constantly change dependent on the various application states.

Standard operating systems have no means to dynamically adjust their real memory size, based on a constantly changing run time state, here the compression ratio CR(t). As the page frame descriptors have to be permanently accessible in memory, most OS allocate a fixed number of page frame descriptors at boot time and manage the memory through their usage. Hence, if the system were to be configured with a fixed ratio, then one must guarantee that the compression ratio will never fall below this fixed ratio otherwise the physical memory will be exhausted and the system will fail.

In order to take full advantage of main memory compression systems, a method is needed for effective virtual memory management within an operating system to dynamically adjust the expanded real memory size that the operating system considers for its operation, as a function of the physical memory utilization at a given time, such that physical memory will never be exhausted. In other words, physical memory utilization shall never exceeds 100%.

In the prior art, there are several patents and publications that utilize software compression techniques to increase free physical memory availability, rather than incurring page-out operations. They pose some relevance to this invention, although neither of the systems deals with main memory compression and therefore encounters the dynamic real memory sizing and physical memory exhaustion problem pertinent to systems with main memory compression.

U.S. Pat. No. 5,559,978 describes a method for increasing the efficiency of a virtual memory system by selective compression of RAM memory content. In particular, this patent identifies non-critical regions of memory (e.g. least frequently accessed memory pages), combines them and compresses them via well known software compression techniques. The combined portions occupy less physical memory resources, thus enlarging the pool of available memory resources. Compressed pages are unmapped from an applications virtual memory translation table and upon access of the virtual address, the virtual memory system, must decompress the compressed page into new pages and remap the decompressed pages to the access virtual address. By compressing non-critical pages and thus increasing physical memory availability, page-out operations are avoided.

U.S. Pat. No. 5,544,349 describes a method for reducing paging activity by dividing the memory into two areas, active list portion and free list portion. When a page is taken away from a process, the mapping of that page in the process page table is removed, the page is compressed into a different container and then placed on the free list. At subsequent access to the data by the process, the page fault handler searches the free list and if it finds the page compressed, it will decompress it into a new frame and remap that page. In essence, this patent is a more limited case of U.S. Pat. No. 5,559,978 where a non-critical region is defined to be a page on the free list.

Wilson et al. in "The Case for Compressed Caching in Virtual Memory Systems" describe a different software approach that utilizes compression for reducing paging activity, but does not require modifications to the operating system. It is based on a compressed virtual paging filesystem. This requires that a part of the physical memory is set aside for the compressed paging filesystem. The virtual management system (VMM) of the operating system decides what pages to page out and hands them over the paging module. But rather than sending the page to disk, the page is compressed within the paging filesystem and only if the paging module exhausts its dedicated memory, it will start paging out compressed pages, thus potentially reducing the number of page-out/page-in operations.

Note that the prior art does not provide solutions to the dynamically changing compression ratio, wherein the operating system can end up with a state where a decrease in the compression ratio can lead to physical memory exhaustion and therefore catastrophic system crash.

SUMMARY OF THE INVENTION

An object of this invention is to provide an improved method of managing memory in an operating system in the presence of hardware main memory compression.

Another object of the present invention is to monitor the physical memory utilization and if physical memory is near exhaustion, to force memory to be paged out, therefore freeing real memory pages.

The invention relates to a method of managing memory in an operating system in the presence of hardware main memory compression. Compression of main memory contents presents to the operating systems an expanded real memory larger than the physically available memory. As the compression ratio varies dependent on the memory content, so does the amount of expanded real memory effectively provided to the operating system and its applications. This invention relates to a method for effective management of this dynamicity of expanded real memory as a function of the compression ratio over time, such that physical memory will never be exhausted.

The method of this invention monitors the physical memory utilization and if physical memory is near exhaustion it forces memory to be paged out, thus freeing up real memory pages. These pages are then zeroed, thus they are highly compressible and therefore reduce the physical memory utilization. Pages that have been forced out due to high physical memory utilization are not made available for allocation. In systems where operating system changes are permitted, this invention dynamically controls the minimum size of the free page pool and zeros pages upon freeing. When the physical memory utilization falls below a critical threshold the mechanism reduces the minimum size of the free pool to allow further allocation. In systems where operating system changes are not possible, pages are allocated by a module (e.g. Device driver) and then zeroed. When the physical memory utilization falls below a critical threshold this method frees some of the explicitly set aside pages. The amount of pages to set aside in both cases (implicitly or explicitly) is a function of the number of active pages in use and the current physical memory utilization.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 1 is a block diagram of a computer system supporting main memory compression in accordance with the present invention.

FIG. 2 shows a block diagram of components and their interactions of a prior art virtual memory management system.

FIG. 3 shows a flow diagram of the control mechanism of managing the free pages in the presence of hardware main memory compression.

FIG. 4 is a graphical description of an objective function for controlling the physical memory utilization through real memory management.

FIG. 5 shows a block diagram of components and their interactions in the enhanced virtual memory management system where operating systems changes are possible.

FIG. 6 shows a block diagram of components and their interactions in the enhanced virtual memory management system where operating systems changes are not possible.

FIG. 7 shows a diagram for the reservation of swap space in the presence of memory compression support.

PREFERRED EMBODIMENT

Introducing memory compression creates the challenge of ensuring that physical memory utilization never exceeds 100% as this would mean that data can not be written back to the physical memory which typically leads to a system crash. The amount of effective real memory $RM(t)$ that the OS can provide at a give time t is dictated by the compression ratio $CR(t)$ of the data as follows: $RM(t)=CR(t)*PM$. By handing out pages to applications the operating system might over-extend the physical memory usage when the compression ratio decreases and therefore must be prepared to take action that reduces the physical memory utilization when the memory controller indicates to the OS that its memory utilization has reached critical levels. Unfortunately, one can not make any assumption nor control the compressibility of data or the physical memory utilization directly. The equation Eq-1 indicates that there are two basic means to reduce physical memory utilization, (1) increase compressibility and (2) decrease the effective real memory size. This invention relies on both techniques: We increase the effective compression rate by increasing the number of zero pages. We reduce the memory used by limiting the number of free pages that can be handed out to applications to avoid additional memory pressure due to the usage of a free page. We achieve that by either explicitly or implicitly setting aside pages. If not enough pages can be set aside, this invention will force additional pages to be swapped out which are subsequently zeroed. Zero pages are highly compressible and therefore these two actions increase the compression ratio and therefore reduces the physical memory utilization.

Before describing the preferred embodiment in more details, following is a list of variables that are used:

| | |
|---|---|
| mu: | Physical memory utilization |
| nr_fp: | Number of free pages of the real memory space RM that the operating system has currently not allocated for any use. |
| min_fp: | Minimum number of free pages to maintain. Most operating system maintain a minimum number of free pages that are only allowed to be allocated in critical situation where forward progress must be guaranteed (e.g. Interrupt handlers) . . . Often min_fp can be a set of variables to indicate various thresholds (e.g. allocation threshold, swap daemon replenishment threshold, etc.) that are separated by some delta. |
| nr_up: | Number of pages currently in use by the OS and its applications |
| max_pg: | Maximum number of real pages in the system as determined by a fixed multiple of the physical memory size. |

By definition max_pg=nr_fp+nr_up. This preferred embodiment is based on the following description of the management of virtual memory and free pages shown in FIG. 2. Those skilled in the art, understand that there are other similar means of managing memory and the methods described within this invention are equally applicable. Free pages are maintained within the free_pool 201 by well established algorithms, such as buddy algorithms or lists. The abstract interface 200 to the free_pool is defined as alloc_pages( ) 202 to allocate a number of consecutive physical pages and free_pages( ) 203 to free a set of physical pages. The nr_fp 204 indicates the number of unallocated free pages in the free pool. These interfaces are for instance utilized by page fault handlers to resolve a page fault. On top of this page frame management, operating systems typically provides a kernel malloc( ) interface for allocation of smaller chunks or object SLAB allocators for its own internal data structures.

In order to guarantee forward progress, an OS maintains a minimum number of free pages (min_fp) 205 at all time and if it falls under this critical threshold 206 it must start increasing the number of free pages (nr_fp) 204. This is typically done by a function try_free_pages( ) 207 which tries to free up pages by flushing the buffer cache, discarding pages from the page cache (read only memory mapped files) and paging out user pages that have not been accessed for some time thus replenishing these pages via the free_pages( ) to the free pool. For instance, read only mapped file buffers can be discarded and reloaded later on demand. The same task is invoked lazily by a kernel swap daemon kswap 208.

This invention relies on a classical control loop (monitor, compute, adjust) shown in FIG. 3 to control the physical memory utilization to never exceed 100%. To do so, a target physical memory utilization is defined that is less then 100% and which accounts for side effects that can result from operations such as outstanding I/O and cache writebacks. The control is implemented as a OS module (device driver/kernel extension/kernel process) and is labeled compressed hereafter. The control loop of compressed must be activated 309 when a preset activation threshold is exceeded. This can be achieved via the interrupt mechanism 110. Once entered, the compressed must loop via a timer mechanism or at other critical points (e.g. the scheduler) until the control achieved its mission, namely reducing the physical memory utilization below a critical level. If interrupt mechanisms are not available, then the compressed must constantly loop based on some timer, albeit that timer can be dependent on the observed physical memory utilization. Compressed 250 performs the following tasks which are described in more detail further on.

Upon entering the control loop, compressed obtains 281 the current memory utilization mu from the memory utilization registers of the memory controller 112. If mu is above an activation level 282, then compressed will actively engage into controlling the real memory size by using an objective function that takes Eq-1 (RM(t)=CR(t)*PM) into account and which is described in more detail further on. This objective function computes 283 the optimum number of real pages opt_fp that can be sustained as a function of the current physical memory utilization mu and the current number of used real page frames nr_up. From the optimum number opt_fp one can determine how many pages have to be reserved 284, i.e. taken away from the free page pool and therefore from the possible allocation to applications by the operating system, thus reducing the effective real memory size nr_max_pg 284.

The determined pages are then set aside by compressed either implicitly or explicitly and zeroed 285, which is described in more detail further down and might require the swap out of pages. If mu is below the activation level 286 and pages were previously set aside and not yet released 287, then compressed determines the optimum number of real pages 288 and from there the number of pages that can be released 289. It then releases the pages 290. In both cases the compressed returns to 281 after some delay 291. The delay is dependent on the physical memory utilization. It must take into account the worst-case change of utilization that can be experienced by the system. In the most general case, we simply loop at a constant time. However in alternate embodiments, this can be forced by interrupts issued by the memory controller once passing through important thresholds. If the worst-case change is to fast to schedule timers in the OS than the OS can temporarily prevent or slow applications responsible for rapid compression deterioration from running until less critical memory utilization levels are reached.

In more detail, the determination of how many pages to be set aside is accomplished as follows and illustrated in FIG. 4. An objective function 306 is defined which specifies how much additional physical memory can be consumed for a given physical utilization. The objective function 306 intersects the current=target curve 304 at the target utilization 307. The target maximum physical memory utilization tmu 307 is typically set below 100% to account for the non linearity that is due to the changing compression ratio and the delay that is due for invoking the compression control mechanism either through timers or interrupts.

When the current utilization mu 312 is less then target tmu 307 utilization, their difference tmu-mu gives the physical amount available for allocation 308. When the current utilization mu 312 is greater then target tmu 307 utilization, the difference tmu-mu is negative thus the result 305 represents the physical amount that must be reclaimed from processes and then added to the free page pool. Given the current physical memory utilization mu 312 and the used page count nr_up and assuming piecewise linear compression with increasing page count we approximate the maximum number of real pages nr_max_pg that can be sustained at the target physical memory utilization tmu to be nr_max_pg=(tmu/mu)*nr_up.

We compute the number of pages allocatable that can still be allocated by the OS without paging activity to be allocatable=nr_fp−min_fp. The optimum number of free pages opt_fp that then should be maintained by the OS and the compression mechanism is determined as opt_fp=nr_max_pg−nr_up=(tmu/mu−1)*nr_up. Once we determined opt_fp, this invention now enforces opt_fp as the maximum number of free pages that can be still handed out by the OS. Dependent on the system, operating system changes may be possible or not, which requires different approaches for the method of this invention to reduce the real memory size to nr_max_pg pages.

The following embodiment is preferred for systems, where operating system changes are possible. We reserve/set-aside pages by dynamically increasing the number of free pages nr_fp in the free pool by (allocatable−opt_fp). By doing so, if the nr_fp falls below the min_fp, we activate the paging daemon kswapd to initiate paging. This frees up the pages, thus reducing the effective real memory size. However, merely reducing the real memory size, does not reduce the physical utilization as doing so does not change any data content in the system, hence the compression ratio stays the same. This invention therefore zeroes at least all pages that were freed by the compression module thus increasing the compression ratio CR(t) which in turn decreases the physical memory utilization PM. Though this condition is sufficient, in the preferred embodiment, we always zero all pages when they are freed instead of zeroing them when they are allocated as it keeps accounting simple (it eliminates the need to track zeroed pages) and it further keeps the physical memory utilization at a minimum as all unused pages are zeroed.

FIG. 5 shows the interaction of the compression control compressed with allocation mechanisms beyond dynamically maintaining the nr_fp. At page allocation time if (nr_fp<min_fp) 206 the page allocator will try to free pages 207, however rather than immediately trying to free pages by reducing the file cache, write buffer cache or paging out user pages, the system now will check first whether the memory utilization allows the handout of pages by calling compress_release( ) 220, which consults the state of compressed and if possible it will increase the min_fp, thus avoiding paging activity. For instance, since the compressed is invoked by a timely mechanism, the memory utilization might have dropped since its last invocation. Since we are invoked synchronously at alloc_pages time, we do not have to be aggressive in releasing pages, as this mechanism always first tries to release more set-aside pages before actually calling try_free_pages( ), as long the opt_fp is not violated.

In an alternate embodiment tailored for systems that do not permit changes to the operating systems, the "set-aside-pages" mechanism through increase of OS internal variables is not possible. In this case, with reference to FIG. 6, a dynamically loaded compressed 250 is a device driver or kernel extension, which will explicitly allocate pages and set them aside in a compression_standby_pool 270. Shown in FIG. 6, the compressed determines the opt_fp number and from there how many pages have to be set aside. It then explicitly allocates those pages, zeroes the pages and enters them into the compression_standby_pool 270. If the OS variables such as nr_fp and min_fp are not available, then the compressed must repeatedly call alloc_pages( ) while monitoring the mu to ensure that the physical memory utilization drops to desirable levels. When the compression ratio falls below another desired level the compressed can start releasing pages via free_pages( ) back to the free-pool.

The mechanisms describe means to force paging such that the physical memory utilization does not exceed preset limits. In addition, the paging or swap space utilization has to be modified. Since we rely on the ability to page out page frames when physical memory utilization is high, we must guarantee that swap space is available. In principle, we are managing the virtual memory that traditionally consists of physical memory and paging or swap space. This is illustrated in FIG. 7. In systems with memory compression, the paging space is utilized as a backup device for pages that must be forced out. At any given time we can assume that PM<RM(t)<RM and that we must be able to page out RM-PM memory if the compression ratio falls down to 1. Hence we divide the swap space into a regular swap space S700 and swap space S_701 of size RM-PM to guarantee that sufficient swap space is available when pages must be forced to be paged due to memory pressure. In addition, the number of pages that can be pinned or locked down in the kernel must be limited to PM.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new, and desire to secure by Letters Patent is:

1. A method of managing memory in a computer system with hardware main memory compression, said method comprising the steps:
　i) obtaining a physical memory utilization from said system;
　ii) determining a target real memory size;
　iii) maintaining a number of set-aside pages that can not be used for general system operation;
　iv) determining a target number of set-aside pages that can not be used for general system operation such that the said target real memory size is achieved;
　v) determining an adjustment to said number of set-aside pages;
　vi) reserving said adjustment to said number of set-aside pages and zeroing said adjustment number of set-aside pages; and
　vii) releasing said adjustment number of reserved set-aside pages.

2. A method as recited in claim 1, wherein said target real memory size is based on an interpolation of the current real memory utilization with measured said physical memory utilization at some set target physical memory utilization.

3. A method as recited in claim 1, wherein said target number of set-aside pages is a function of the difference between the current real memory utilization and said target real memory size.

4. A method as recited in claim 1, wherein adjustment to the number of set-aside pages is a function of the difference between current real memory utilization and said target real memory size.

5. A method as recited in claim 1, wherein the reserving step of said adjustment number of set-aside pages includes the step of increasing the number of minimum free pages maintained by the operating system.

6. A method as recited in claim 5, wherein pages that are freed by increasing said number of minimum free pages maintained by the operating system are zeroed.

7. A method as recited in claim 1, wherein the releasing step of said adjustment number of set-aside pages includes the step of decreasing the number of minimum free pages maintained by the operating system.

8. A method as recited in claim 1, wherein the reserving step of said adjustment number of set-aside pages includes the step of explicitly allocating pages from the operating system and zeroing said pages.

9. A method as recited in claim 1, wherein the releasing step of said adjustment number of set-aside pages includes the step of explicitly freeing pages from the previously said set-aside pages.

10. A method as recited in claim 1, wherein swap space is reserved on at least one swap device to accommodate the content of pages that are forced out due to high physical memory utilization.

11. A method as recited in claim 10, wherein said reserved swap space is a function of the difference of the maximum real memory size and the physical memory size.

12. A system for managing memory in a computer system with hardware main memory compression, said memory managing system comprising the steps:

i) means for obtaining a physical memory utilization form said computer system;

ii) means for determining a target real memory size;

iii) means for maintaining a number of set-aside pages that can not be used for general system operation;

iv) means for determining a target number of set-aside pages that can not be used for general system operation such that the said target real memory size is achieved;

v) means for determining an adjustment to said number of set-aside pages;

vi) means for reserving said adjustment number of set-aside pages and zeroing said adjustment number of set-aside pages; and vii) means for releasing said adjustment number of reserved set-aside pages.

13. A memory managing system as recited in claim 12, wherein said target real memory size is based on an interpolation of the current real memory utilization with measured said physical memory utilization at some set target physical memory utilization.

14. A memory managing system as recited in claim 12, wherein said target number of set-aside pages is a function of the difference between the current real memory utilization and said target real memory size.

15. A memory managing system as recited in claim 12, said adjustment to the number of set-aside pages is a function of the difference between the current real memory utilization and said target real memory size.

16. A program storage device readable by machine, tangible embodying a program of instructions executable b the machine to perform method steps for managing memory in a computer system with hardware main memory compression, said method steps comprising:

i) obtaining the physical memory utilization from said system;

ii) determining a target real memory size;

iii) maintaining a number of set-aside pages that can not be used for general system operation;

iv) determining a target number of set-aside pages that can not be used for general system operation such that the said target real memory size is achieved;

v) determining an adjustment to said number of set-aside pages;

vi) reserving said adjustment number of set-aside pages and zeroing said adjustment number of set-aside pages; and vii) releasing said adjustment number of reserved set-aside pages.

17. A program storage device according to claim 16, wherein said target real memory size is based on an interpolation of the current real memory utilization with measured said physical memory utilization at some set target physical memory utilization.

18. A program storage device according to claim 16, wherein said target number of set-aside pages is a function of the difference between the current real memory utilization and said target real memory size.

19. A program storage device according to claim 16, wherein said adjustment to the number of set-aside pages is a function of the difference between the current real memory utilization and said target real memory size.

\* \* \* \* \*